US009856096B2

(12) United States Patent
Hanisch et al.

(10) Patent No.: US 9,856,096 B2
(45) Date of Patent: Jan. 2, 2018

(54) TRANSPORTING ARRANGEMENT (71) Applicant: Robert Bosch GmbH, Stuttgart (DE)

(72) Inventors: Markus Hanisch, Fellbach (DE);
Alfred Wipf, Jestetten (DE);
Hansruedi Wanner, Gächlingen (CH);
Philipp Kathan, Schaffhausen (CH);
Daniel Schwarz, Unterstammheim (CH)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 14/914,729

(22) PCT Filed: Jul. 24, 2014

(86) PCT No.: PCT/EP2014/065906
§ 371 (c)(1),
(2) Date: Feb. 26, 2016

(87) PCT Pub. No.: WO2015/028212
PCT Pub. Date: Mar. 5, 2015

(65) Prior Publication Data
US 2016/0207720 A1 Jul. 21, 2016

(30) Foreign Application Priority Data

Aug. 26, 2013 (DE) .......................... 10 2013 216 949
Jul. 21, 2014 (DE) .......................... 10 2014 214 107

(51) Int. Cl.
*B65G 54/02* (2006.01)
*H02K 41/02* (2006.01)
(52) U.S. Cl.
CPC ............. *B65G 54/02* (2013.01); *H02K 41/02* (2013.01)
(58) Field of Classification Search
CPC ................................. B65G 54/02; H02K 41/02
See application file for complete search history.

(56) References Cited

U.S. PATENT DOCUMENTS 4,860,662 A * 8/1989 Matsumoto ............. B61B 13/12
104/107
5,492,066 A * 2/1996 Nozaki ................... B61C 13/04
104/119

(Continued)

FOREIGN PATENT DOCUMENTS

CN 1572683 A 2/2005
EP 0813494 B1 † 9/1999

(Continued)

OTHER PUBLICATIONS

International Search Report for Application No. PCT/EP2014/065906 dated Nov. 24, 2014 (English Translation, 3 pages).

*Primary Examiner* — Gerald McClain
*Assistant Examiner* — Keith R Campbell
(74) *Attorney, Agent, or Firm* — Michael Best & Friedrich LLP (57) ABSTRACT

A transporting arrangement (1) includes at least one guide system having a fixed guide rail (4) and supporting elements (6) which are guided on the guide rail (4), in particular ones designed in the form of rollers and/or sliders, also comprising at least one transporting unit (5), which can be moved in a movement direction (8) and on which the supporting elements are fastened, wherein the transporting unit (5) is guided on the guide rail (4) by the supporting elements (6), and further comprising a linear motor drive arrangement having a fixed stator unit (3) and at least one magnetic element (15), in particular a permanent magnet, on the transporting unit (5), wherein a vertical guide plane (16) is defined, this running parallel to the movement direction (8) and through the center of the guide system, wherein a vertical motor plane (17) is defined, this running parallel to the movement direction (8) and through the center of the linear motor drive arrangement, and wherein a basic body (Continued)

(11) of the transporting unit (5) is arranged between the guide plane (16) and the motor plane (17).

14 Claims, 12 Drawing Sheets

(56) References Cited

U.S. PATENT DOCUMENTS

| | | | | |
|---|---|---|---|---|
| 5,664,503 | A | * | 9/1997 | Kawai ............... B61B 13/04 |
| | | | | 105/141 |
| 6,876,107 | B2 | | 4/2005 | Jacobs |
| 6,876,896 | B1 | * | 4/2005 | Ortiz ............... B29C 65/02 |
| | | | | 318/135 |
| 9,292,018 | B2 | * | 3/2016 | Hanaka ............ B61L 25/026 |
| 2012/0018282 | A1 | * | 1/2012 | Loecht ............... B65G 19/02 |
| | | | | 198/725 |
| 2015/0048693 | A1 | * | 2/2015 | Prussmeier ......... B65G 54/02 |
| | | | | 310/12.09 |
| 2015/0144462 | A1 | * | 5/2015 | Weiss ............... B65G 35/06 |
| | | | | 198/619 |

FOREIGN PATENT DOCUMENTS

| | | |
|---|---|---|
| EP | 0957051 | 11/1999 |
| EP | 1123884 A1 † | 8/2001 |
| EP | 1182153 B1 † | 2/2002 |
| EP | 1714923 | 10/2006 |
| JP | H02209315 A † | 8/1990 |
| JP | H02110901 | 9/1990 |
| WO | 9627544 | 9/1996 |
| WO | 2010086060 | 8/2010 |
| WO | 2011131385 | 10/2011 |

\* cited by examiner
† cited by third party

TRANSPORTING ARRANGEMENT

BACKGROUND OF THE INVENTION

The present invention relates to a transporting arrangement for moving products. The transporting arrangement is used especially to transport products and/or containers in filling or packaging plants.

Linear, rotary or integrated transporting arrangements are known in which the transporting units (also: movers) are mounted on a linear, rotary or integrated guide system. The guide rails of the guide system thereby form a path of movement, on which a plurality of individual transporting units are freely movable. The transporting units can be moved via electromagnetic linear drives. By means of these transporting units, products in various formats can be transported individually and independently of one another. U.S. Pat. No. 6,876,107B2 constitutes exemplary prior art.

SUMMARY OF THE INVENTION

The transporting arrangement according to the invention ensures a very low-maintenance and reliable operation while at the same time being cost effectively manufactured and easy to install. The design of the transporting arrangement is therefore of as small a construction as possible; thus enabling the space requirements to be kept to a minimum. A compact design results from the special arrangement of the guide system and the motor plane, and the transporting units can pass through very tight radii at the same time. These advantages are achieved by the transporting arrangement according to the invention, comprising at least one guide system having a fixed guide rail and a plurality of supporting elements. The supporting elements are particularly designed in the form of rollers and/or sliders and/or as levitation elements, i.e. freely floating elements on which guide rails are carried. The transporting arrangement furthermore comprises a transporting unit. This transporting unit is connected to the supporting elements; thus enabling the transport unit to be guided on the guide rail and to be linearly movable in a movement direction. A linear motor drive arrangement provides for the drive of the transporting unit which can be individually actuated. To this end, the linear motor drive arrangement comprises a fixed stator unit. The stator unit extends by means of a plurality of coils parallel to the guide rail. In addition, the linear motor drive arrangement comprises at least one magnetic element on the transporting unit. This magnetic element is particularly a permanent magnet. By means of an appropriate actuation of the coils in the stator unit, a magnetic force acts on said magnetic elements of the transporting unit. As a result, the transporting units can be accelerated, decelerated and/or be positioned at rest. As seen in cross section, the guide system is disposed laterally with respect to the linear motor drive arrangement. A substantially vertical guide plane is defined, which at least approximately runs parallels to the movement direction and through the center of the guide system. A substantially vertical motor plane is furthermore defined, which is likewise aligned approximately parallel to the movement direction and runs through the center of the linear motor drive arrangement. A substantial proportion of the transporting unit, denoted as basic body, is arranged between the guide plane and the motor plane. This basic body preferably carries at least the supporting elements and at least one of the magnetic elements. A part of a measuring system can furthermore be arranged on said base body of the transporting unit, as will be explained later in detail.

Provision is preferably made for a carrier, wherein the guide rail and the stator unit are each separately attached to the carrier, in particular screwed thereto. As a result, the guide rail is not directly supported on the stator unit, which has a positive effect on the accuracy of the system. Manufacturing tolerances of the guide system and the drive system are not cumulative and can be compensated by the possible adjustment of the positions of the components in relation to one another.

The supporting elements are in contact with the guide rail at at least one contact point. The guide plane particularly lies in the center between the outermost and the innermost contact point.

The transporting arrangement preferably extends in a U-shaped manner across the stator unit. In so doing, a magnetic element can be disposed on each side of the stator unit of the transporting arrangement. As a result, an efficiently functioning linear motor is possible. The center of the linear motor drive arrangement is therefore the center between the two magnetic elements or, respectively, the center of the stator unit.

The transporting arrangement preferably comprises a measuring system for detecting the position of the transporting unit. The measuring system preferably functions in a contactless manner. Said measuring system comprises at least one fixed measuring component. This fixed measuring component is preferably disposed on the stator unit. Said measuring system furthermore comprises a second measuring component on the transporting arrangement. The two measuring components correspond to one another; thus enabling the position of the transporting unit to be determined when the two measuring components pass one another. The position of the transporting unit can also be determined at rest.

According to a first variant, the second measuring component on a side of the basic body of the transporting unit which faces the motor plane. The second measuring component is particularly a contour that is milled into the basic body of the transporting unit.

According to a second variant, the second measuring component is located on a further limb. The transporting unit thus extends in a U-shaped manner across the stator unit, wherein the basic body forms a limb, a further limb lying opposite thereto on the other side of the stator unit. The second measuring component preferably faces the motor plane. The second measuring component is particularly a contour milled into the further limb of the transporting unit. The second measuring component is alternatively mounted directly on the further limb or on said further limb via an intermediate piece. In so doing, the further limb is preferably designed shorter than the basic body. The further limb is therefore removed from the zone of influence of the measuring system; and the material thereof (electrically conductive or nonconductive) having relatively massive geometry does not influence or only slightly influences the measuring behavior. As a result, improved measuring results can be achieved, which positively affects the accuracy and movement quality of the system.

A substantially vertical measuring plane is preferably designed at least approximately parallel to the movement direction and through the center of the measuring system. In relation to the guide plane, this measuring plane preferably lies on the same side as the motor plane. According to the first variant, the measuring plane lies between the motor plane and guide plane. This very central arrangement of the measuring system enables a low-tolerance. According to the second variant, the motor plane lies between the guide plane and the measuring plane.

The guide rail of the transporting arrangement preferably forms a curved track. The curved track can be continuous, i.e. circular or annular, or finite. The curved track is composed of at least one curved section and, if applicable, at least one straight section. The curved sections are defined by radii which each comprise a center. A neutral axis runs through each center perpendicularly to the guide plane.

The guide rail is spaced apart from the neural axis (measured at the center) at first distance. The measuring system (measured at the center) is spaced apart from the neutral axis at a second distance. The at least one magnetic element (measured at the center) is spaced apart from the neutral axis at a third distance. The distances to be compared lie on a common perpendicular to the movement direction. The shortest distance to the next neutral axis is measured in each case. The first and the second distance deviate from one another preferably by a maximum of 20%, most preferably by a maximum of 15%. The first and the third distance deviate from one another preferably by a maximum of 20%, most preferably by a maximum of 15%. The first distance is preferably greater than the third distance. A low-tolerance measuring is possible as a result of this small deviation between the distances.

The transporting unit is preferably, as seen in a cross section defined perpendicularly to the movement direction, designed asymmetrically. This asymmetrical design primarily defines that a guide system is configured only on one side. There is correspondingly only one guide rail.

The transporting unit has a first center of mass in the unloaded state. When transporting a product, the transporting unit has a second center of mass. The second center of mass preferably lies closer to the motor plane than the first center of mass.

The transporting arrangement comprises a holding fixture for carrying a product or a driver for pushing a product. The holding fixture or, respectively, driver preferably lies on a different side of the motor plane than the guide plane. The two different centers of mass in the loaded and unloaded state result from this very asymmetrical arrangement. By virtue of the fact that the holding fixture or the driver essentially lie on a different side of the motor plane than the guide plane, the displacement of the center of mass results when loading. The asymmetrical embodiment is significantly more cost effective than the symmetrical embodiment and still has, by means of this arrangement, the advantage that accelerations of the transport unit result substantially in the direction of the movement direction in the loaded state and thus fewer friction losses and accordingly less wear can occur.

The transporting unit is preferably U-shaped in the cross section defined perpendicularly to the movement direction, wherein the two limbs of the U-shape are preferably of different length. One of the limbs of the U-shape forms the basic body of the transporting unit. The two limbs are connected to one another by means of a base. The driver or the holding fixture mentioned above are preferably arranged on the base or on the limb opposite the basic body.

Provision is also alternatively made to the asymmetrical embodiment described above for a guide system to be arranged on each side of the motor plane. This ensures a very stable and robust construction.

Provision is preferably made for the supporting elements and the guide rail to have V-shaped contact surfaces. The supporting elements are particularly designed as rollers having V-shaped notches. As a result, the guide system also provides a lateral guidance. The roller axes are preferably parallel to one another in this case.

Provision is alternatively made for the roller axes of the rollers to be inclined at different angles to the guide plane; thus enabling a lateral guidance to result from this inclined arrangement of the rollers.

The transportation arrangement according to the invention can be operated in a substantially vertical direction as described here as well as in a substantially horizontal arrangement.

The invention furthermore comprises a system comprising the transport arrangement, as it was described above, within, upstream of and/or downstream of filling equipment or packaging equipment. The transporting units can be used for the purpose of supplying products, in particular bulk materials, individually packaged goods, bags and containers to the filling equipment or packaging equipment. The transporting arrangement according to the invention can furthermore be used for the purpose of moving tools, in particular sealing tools in packaging systems. Provision is particularly made for the filling or packaging equipment to be designed as a horizontal tubular bag machine.

BRIEF DESCRIPTION OF THE DRAWINGS

Exemplary embodiments of the invention are described below in detail with reference to the accompanying drawings. In the drawings.

DETAILED DESCRIPTION

Figure 7:
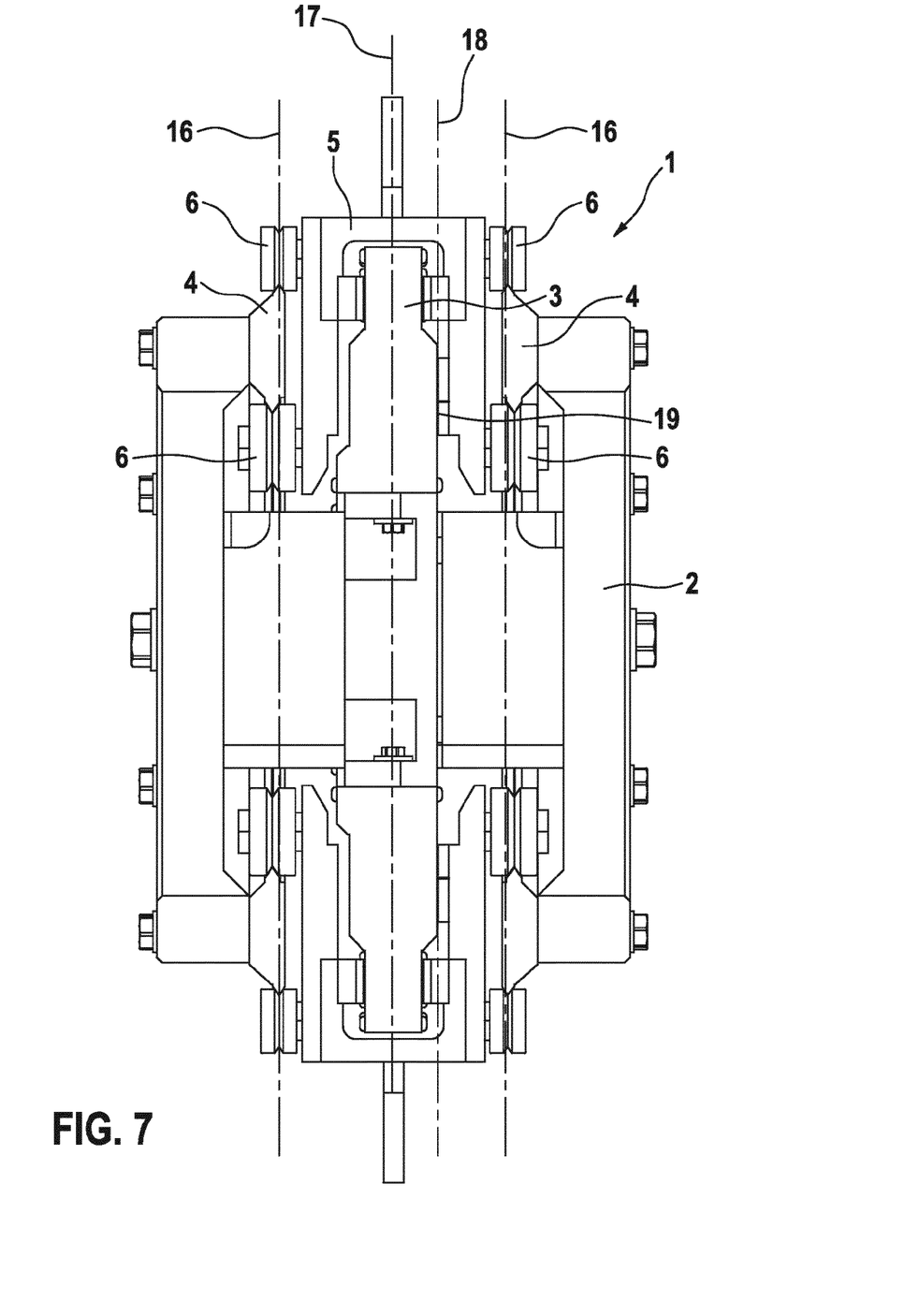
FIG. 7 shows the inventive transporting arrangement according to a second exemplary embodiment.
Figure 8:
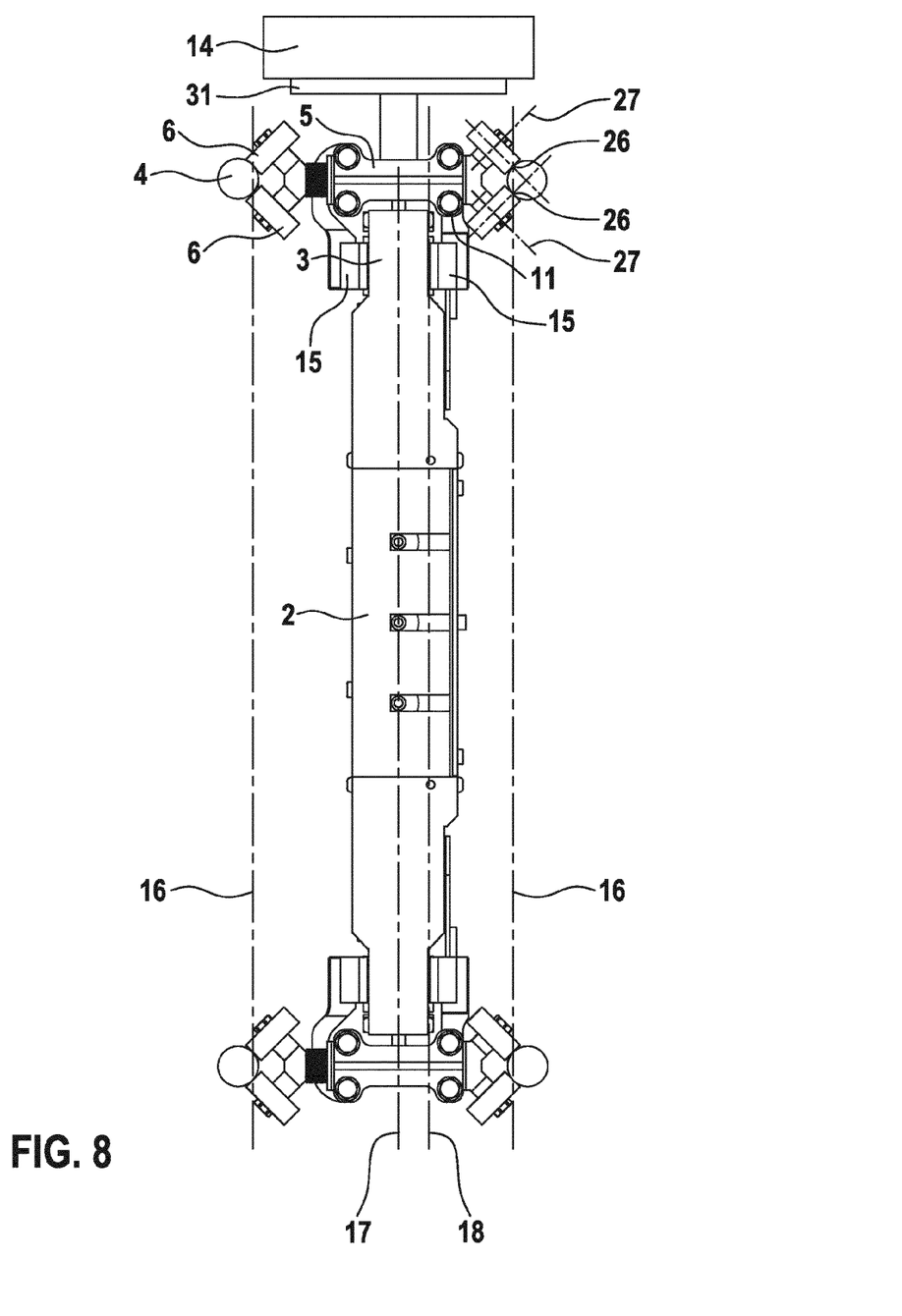
FIG. 8 shows the inventive transporting arrangement according to a third exemplary embodiment.

A first exemplary embodiment is described below with the aid of FIGS. 1 to 6. FIG. 7 shows a second exemplary embodiment, and FIG. 8 shows a third exemplary embodiment. Identical or, respectively, functionally identical components are provided with the same reference signs in all of the examples.

Figure 1:
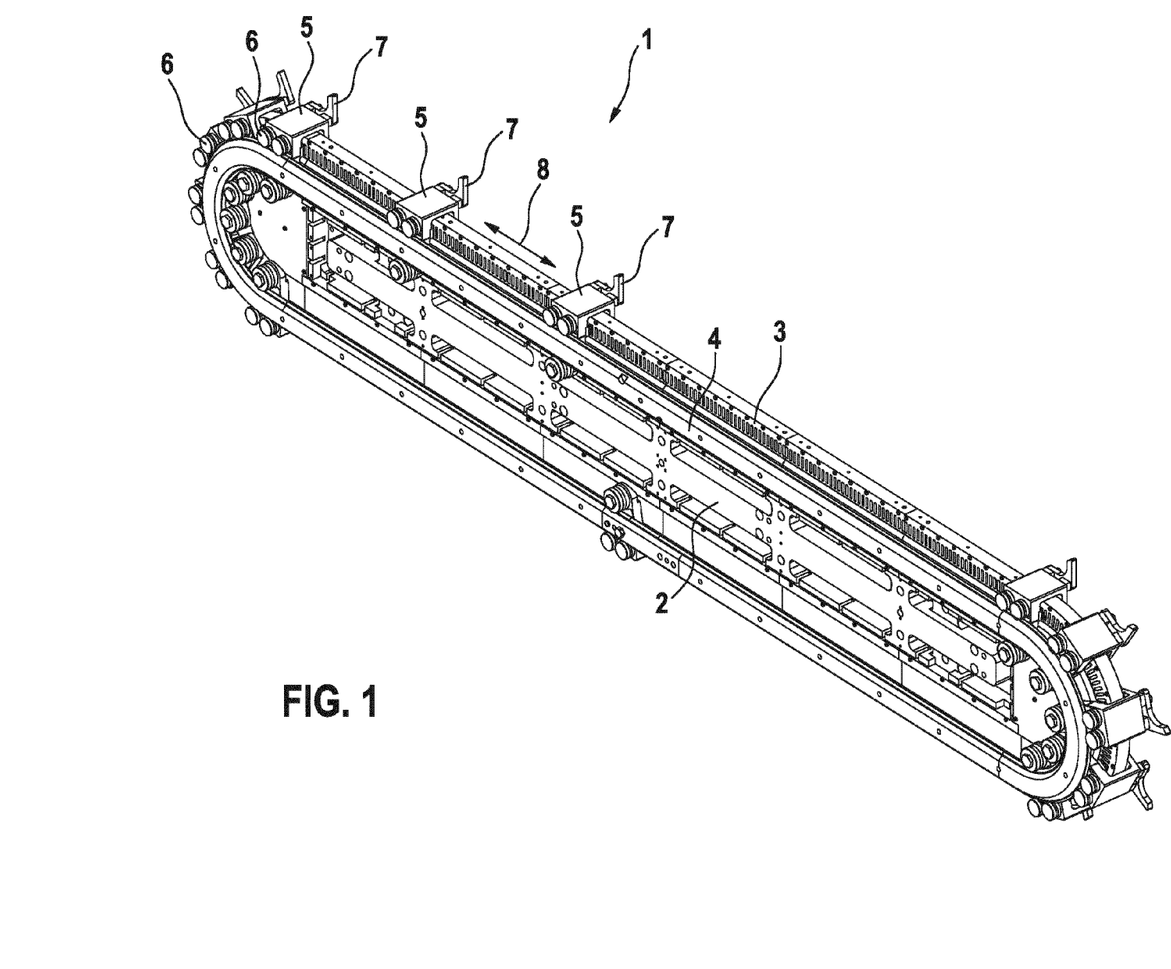
FIG. 1 shows an inventive transporting arrangement according to a first exemplary embodiment.
Figure 2:
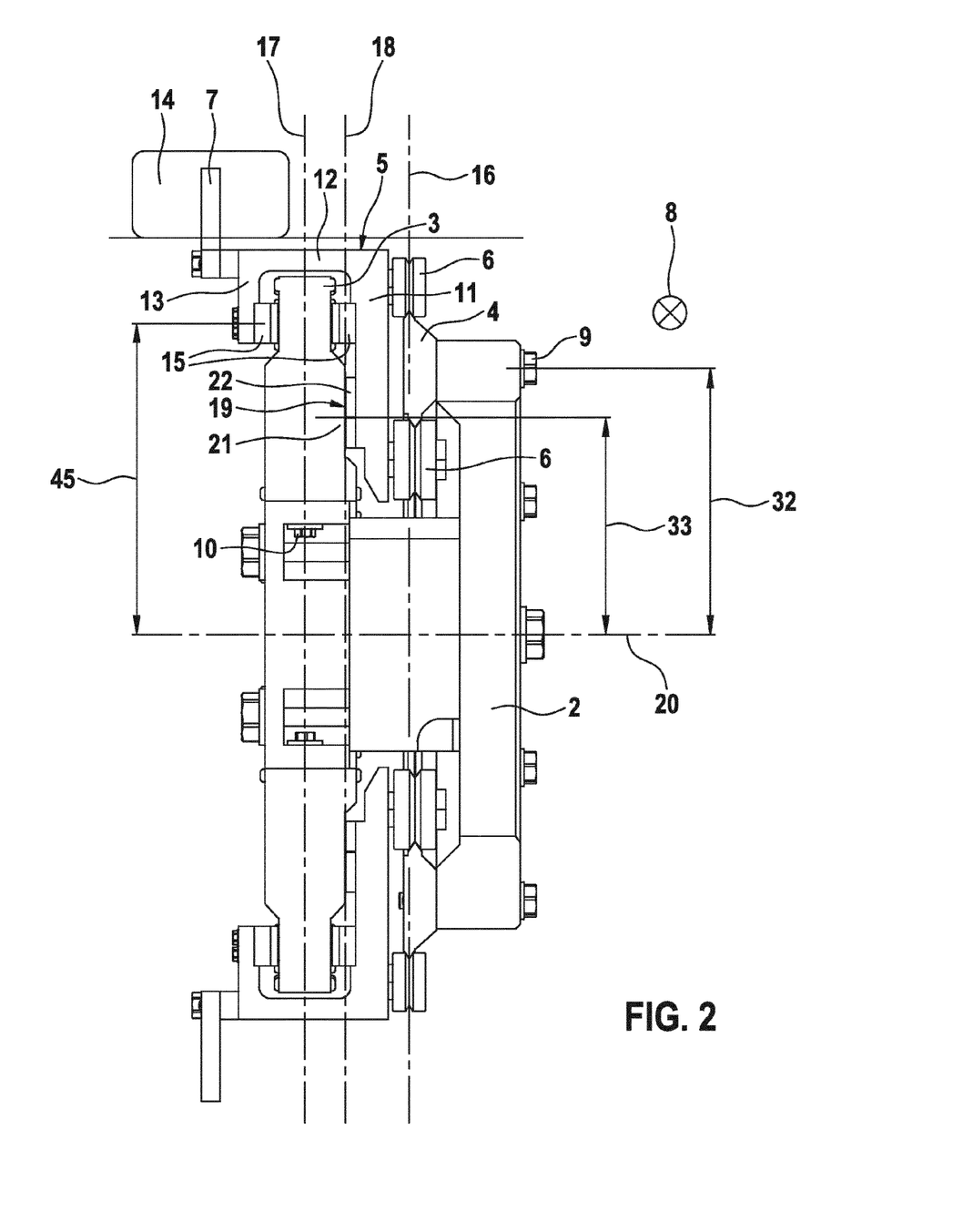
FIG. 2 shows a sectional view of the inventive transporting arrangement according to the first exemplary embodiment.

FIG. 1 shows the transporting arrangement 1 in an isometric view. FIG. 2 shows a sectional view. The transporting arrangement 1 comprises a carrier 2. A stator unit 4 and a guide rail 4 are mounted on this carrier 2. The guide rail 4 is attached by means of a first screw connection 9 to the carrier 2. The stator unit 3 is attached by means of a second screw connection 10 to the carrier 2.

The stator unit 3 and the guide rail 4 define an annular, continuously rotating movement track for a plurality of transporting units 5. Each transporting unit 5 comprises three supporting elements 6 designed as rollers. These supporting elements 6 are guided on the guide rail 4. As a result, the transporting units 5 can be moved linearly in the movement direction 8.

Each transporting unit 5 comprises a driver 7. The transporting unit 5 can push a product 14 (FIG. 2), e.g. on a product conveyor, by means of this driver 7.

Each transporting unit 5 has two magnetic elements 15 designed as permanent magnets. These magnetic elements 15 are located on both sides of the stator unit 3. The stator unit 3 together with the magnetic elements 15 forms a linear motor drive arrangement. Each transporting unit 5 can be accelerated, decelerated and positioned during stoppage separately and independently of one another by means of an appropriate actuation of the coils in the stator unit 3.

FIG. 2 shows the exact design of the transporting unit 5. This design comprises a basic body 11, to which one of the magnetic elements 15 and the three supporting elements 6 are attached. On the other side of the stator unit 3, a further limb 13 of the U-shaped configuration of the transporting unit 5 is located opposite the basic body 11. Said further limb 13 is connected by means of a base 12 to the basic body 11. The basic body 11, the base 12 and the further limb 13 are preferably manufactured as one piece. The second magnetic element 15 is attached to said further limb 13. The driver 7 is likewise attached to said further limb 13.

The supporting elements 6 together with the guide rail 4 form a guide system. This guide system has a guide plane 16. The guide system runs through the center (zz) of the guide system between the innermost contact point (xx) and the outermost contact point (yy), is oriented vertically and is parallel to the movement direction 8.

A motor plane 17 runs through the center of the linear motor drive arrangement, parallel to the movement direction and likewise in a vertical direction. The base body 11 is arranged between the motor plane 17 and the guide plane 16.

The transporting arrangement 1 furthermore comprises a measuring system 19. The measuring system 19 comprises a stationary first measuring component 21 and a second measuring component 22 (see FIG. 4) attached to the transporting unit 5. The position of the respective transporting unit 5 can be detected in a contactless manner by means of the measuring system 19.

A measuring plane 18 is defined centrally through the two measuring components 21, 22, parallel to the movement direction 8 and in a vertical orientation. This measuring plane 18 preferably lies between the guide plane 16 and the motor plane 17.

FIG. 2 furthermore shows a neutral axis 20. The guide rail 4 is spaced apart from the neutral axis 20 at a first distance 32. The measuring system 19 is spaced apart from the neutral axis 20 at a second distance 33. The magnetic elements 15 are spaced apart from the neutral axis 20 at a third distance 45. The two distances 32, 33 are as close together as possible in order to achieve an accurate measurement.

Figure 3A:
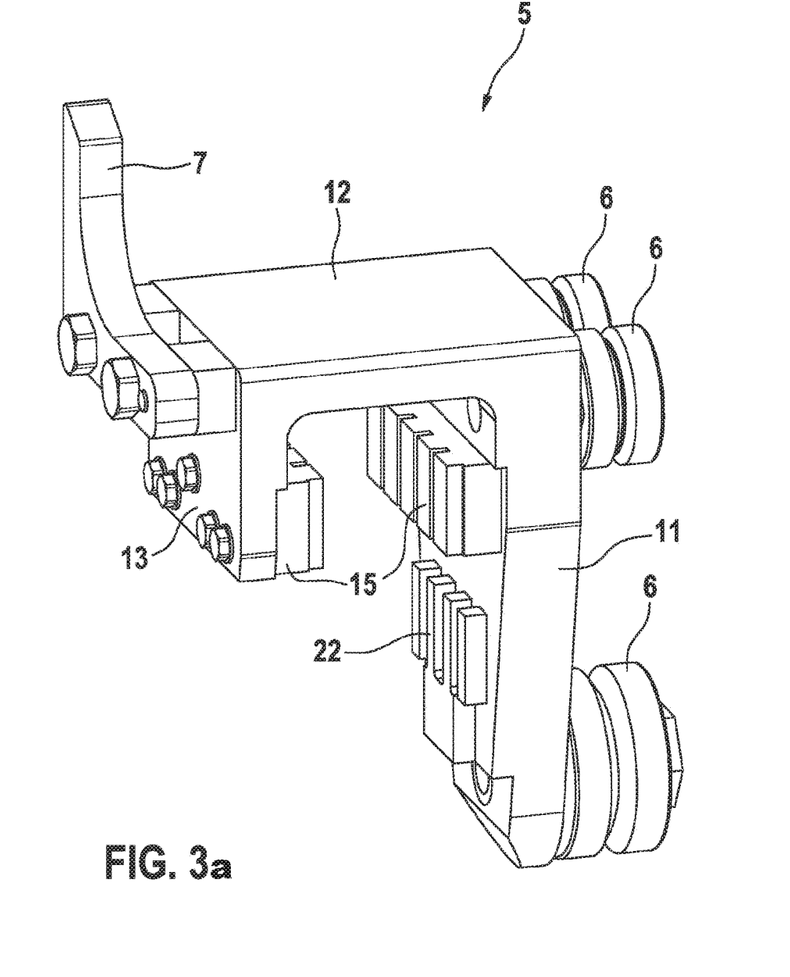
FIG. 3a shows an isometric view of a transporting unit of the inventive transporting arrangement according to the first exemplary embodiment.

FIG. 3a shows the transporting unit 5 in detail. It can be seen that three supporting elements 6, designed as rollers, are used.

Figure 3B:
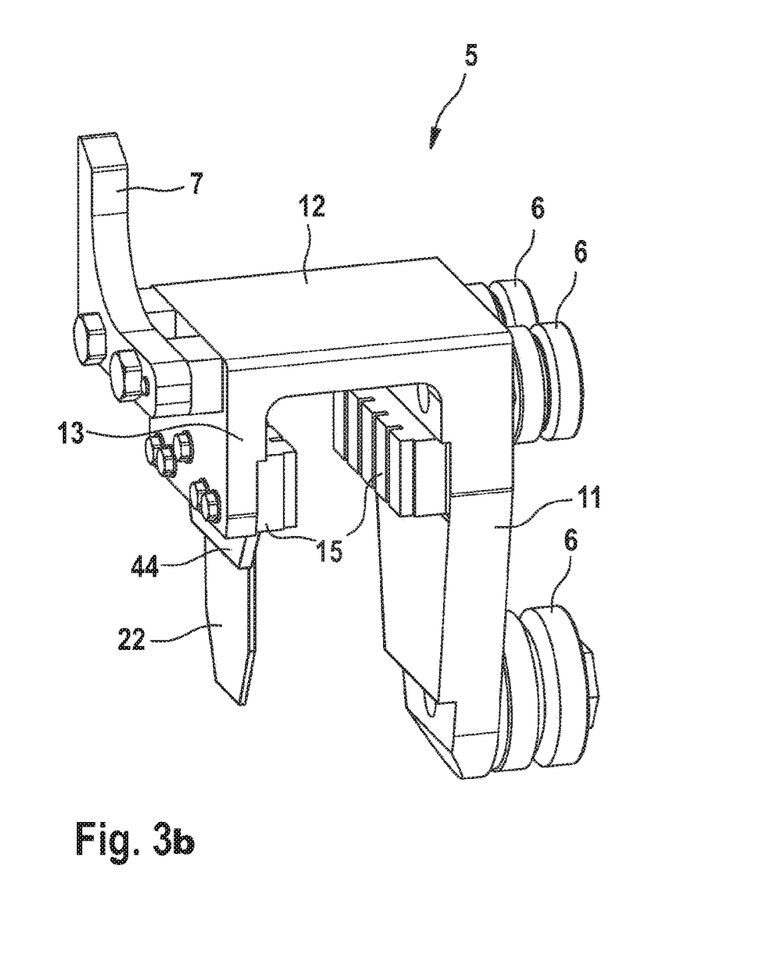
FIG. 3b shows an isometric view of a transporting unit of the inventive transporting arrangement according to a variant of the first exemplary embodiment.

FIG. 3b shows a variant to the first exemplary embodiment, in which the second measuring component 22 is attached to the further limb 13 by means of an intermediate piece 44. The guide plane 16 and the measuring system 19 are located here on opposite sides of the motor plane 17.

Figure 4:
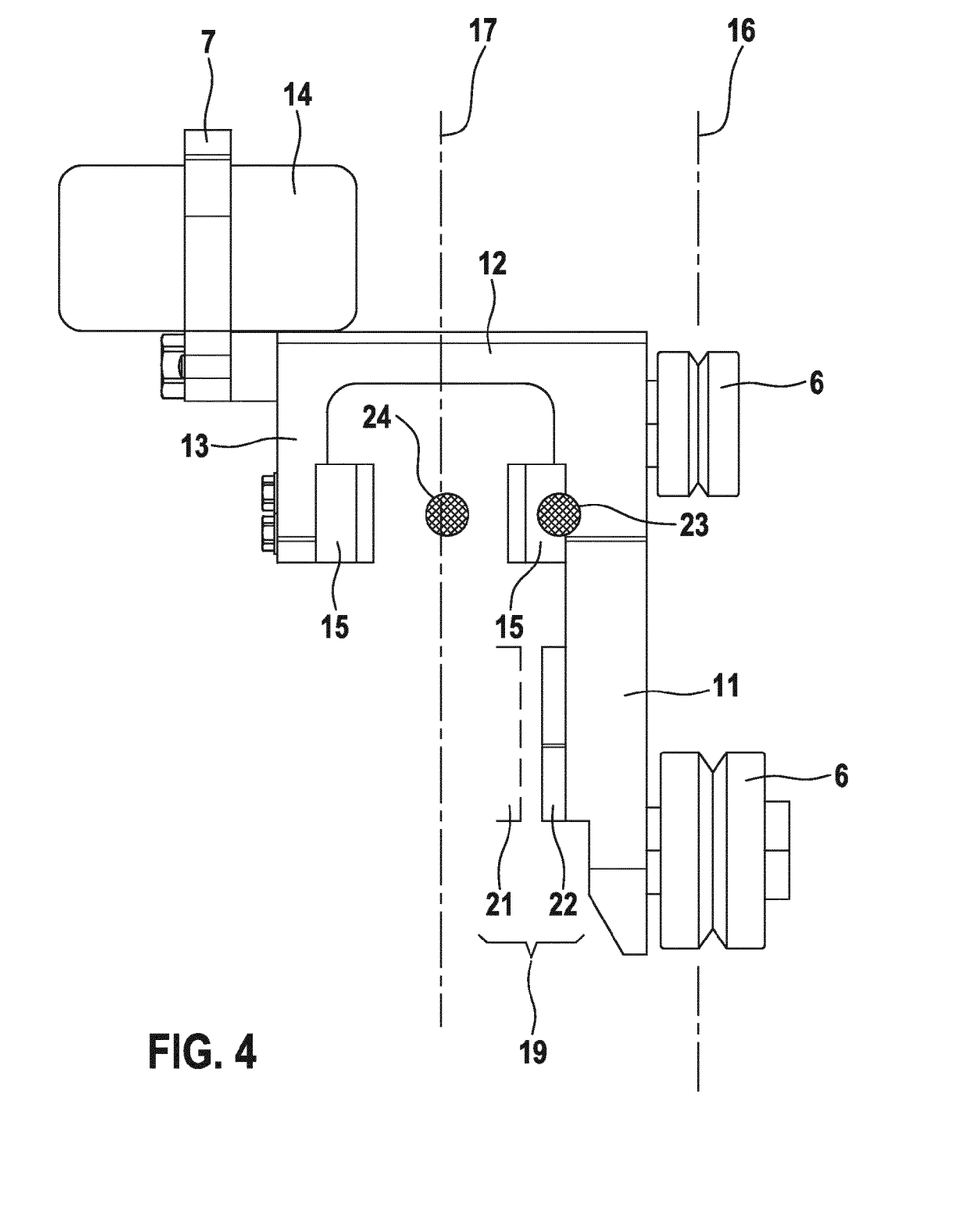
FIG. 4 shows a further view of the transporting unit of the inventive transporting arrangement according to the first exemplary embodiment.

In a front view, FIG. 4 shows one of the transporting units 5 including a product 14. The transporting units 5 in the first exemplary embodiment are asymmetrically designed. This means that a guide system is provided only on one side of the motor plane 17. The driver 7 for transporting the product 14 is located on the opposite side. In the unloaded state, i.e. without product 14, the transporting unit 5 has a first center of mass 23. In the loaded state, the transporting unit 5 has a second center of mass 24. The asymmetry of the transporting unit 5 is designed in such a way that the second center of mass 24 lies closer to the motor plane than the first center of mass 23.

FIG. 4 furthermore shows the first measuring component 21, which is attached to the stator unit 3, with a dashed line.

Figure 5:
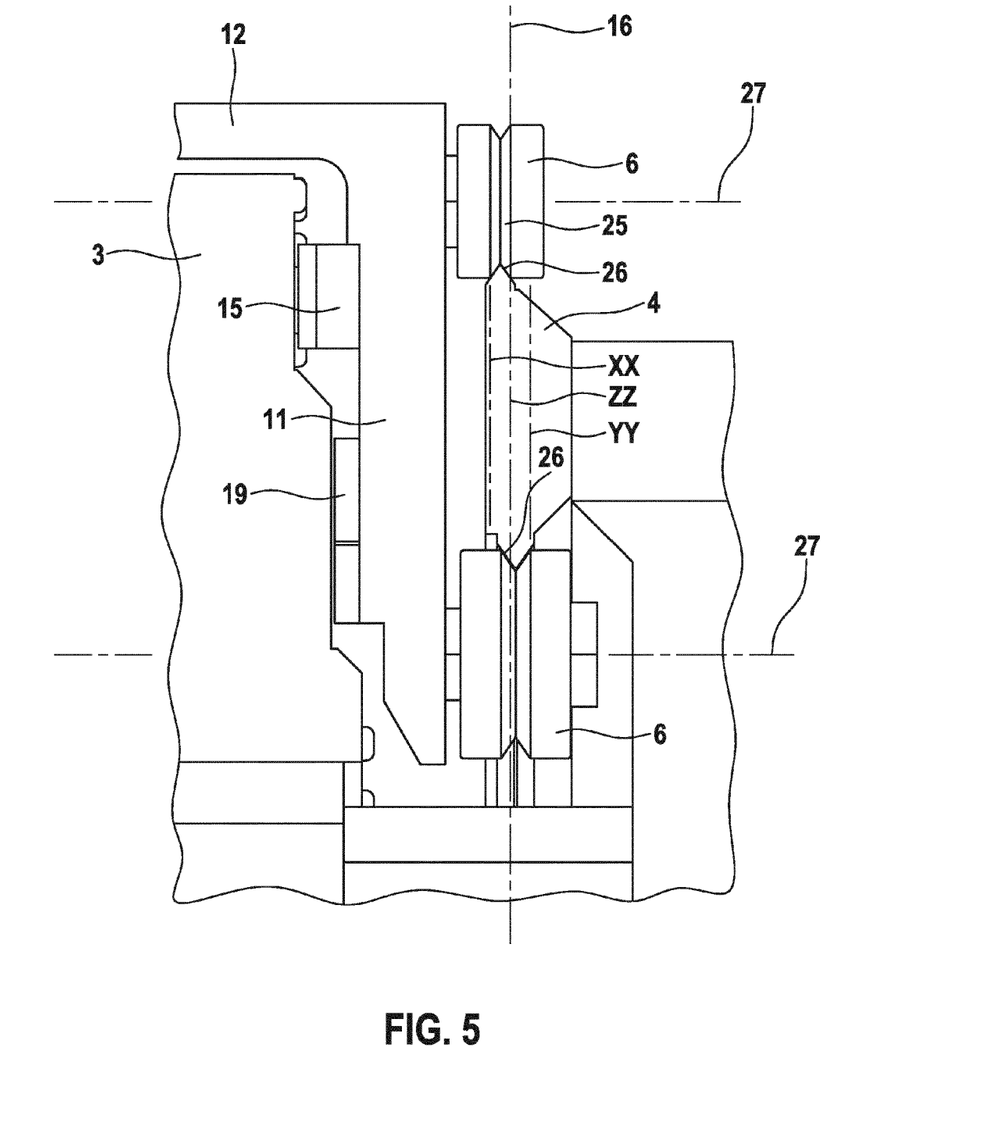
FIG. 5 shows a detailed view of the inventive transporting arrangement according to the first exemplary embodiment.

FIG. 5 shows in detail the design of the supporting elements 6. The supporting elements 6, designed as rollers, and the guide rails 4 have in each case a V-shape 25. A lateral guidance of the supporting elements 6 on the guide rail 4 also results from this V-shape 25. The supporting elements 6 abut against contact points 26 on the guide rail 4. The center of the guide system and therefore the guide plane 16 is defined by means of said contact points 26.

FIG. 5 furthermore shows the roller axes 27 of the supporting elements 6. The measuring system 19 as well as the magnetic elements 15 are located between the roller axes 27.

Figure 6:
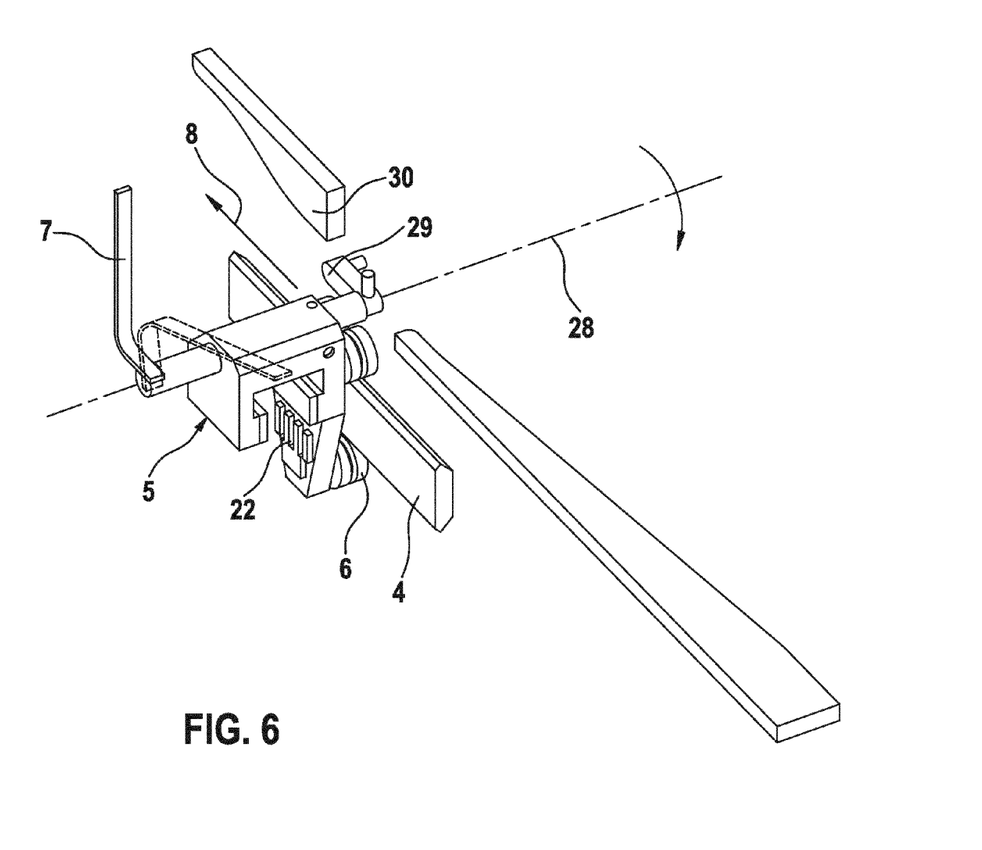
FIG. 6 shows a further detailed view of the inventive transporting arrangement according to the first exemplary embodiment.

FIG. 6 shows several details of the transporting arrangement 1. According to FIG. 6, the driver 7 is disposed so as to be pivotable about a pivoting axis 28 on the transporting unit 5. The pivoting axis 28 extends horizontally and perpendicularly to the movement direction 8.

A cam 29 is provided on the side of the guide system. The driver 7 can be pivoted by means of this cam 29. A link 30 can, for example, be disposed fixed in position. As soon as the cam 29 runs onto the link 30, the driver 7 can automatically be pivoted.

FIG. 7 shows the transporting arrangement 1 according to the second exemplary embodiment. In the second exemplary embodiment, guide systems are respectively arranged on both sides of the motor plane 17, so that a guide plane 16 is provided on each side of the motor plane 17. The measuring plane 18 is furthermore located between the guide plane 16 and the motor plane 17.

FIG. 8 shows the transporting arrangement 1 according to the third exemplary embodiment. In the third exemplary embodiment, the roller axes 27 are not disposed perpendicularly to the guide plane 16. A lateral guidance is also possible without the V-shape 25 by means of these oblique roller axes 27. Straight lines through the contact points 26 in turn define the center of the guide system and therefore the guide plane 16.

The exemplary embodiments show that an essential component of the transporting units 5, namely the basic body 11, can be disposed between the motor plane 17 and the guide plane 16. A very low installation height thus results, and small radii are to be navigated. The stator unit 3 is directly mounted onto the carrier 2. This carrier 2 can, for example, constitute a machine housing or is in turn mounted on the machine housing. The guide rail 4 is likewise mounted on said carrier 2; however, in so doing, not directly supported on or connected to the stator unit 3. The guide rail 4 can consist of a plurality of straight segments or curved segments or of a single part.

The arrangement of the basic body 11 between the motor plane 17 and the guide plane 16 has furthermore the advantage that the air gap between the stator unit 3 and the magnetic elements 15 is very small and remains constant. This increases the efficiency of the linear motor drive arrangement.

The second measuring component 22 is preferably configured on the basic body 11. This has the advantage that the air gap between the two measuring components 21, 22 is kept very constant by the reduction of the tolerance chain, which advantageously affects the measuring accuracy and hence the accuracy and movement quality of the system. In an especially advantageous manner, the second measuring component 22 is formed as a structure milled from the basic body.

The two distances 32, 33 are preferably approximately equal in size. The measuring plane 18 and the motor plane 17 advantageously lie on the same side in relation to the guide plane 16. In an especially advantageous manner, the measuring plane 18 lies between the motor plane 17 and the guide plane 16. The guide plane 16, the motor plane 17 and the measuring plane 18 are at least approximately parallel to one another. This has the advantage that a very small leverage effect of the transporting unit 5 with respect to the measuring system 19 is present because the transporting unit is supported in the region of the measuring system 19. As a result, the measuring accuracy can be substantially improved and consequently produces a smoother and more precise operation of the linear motors.

The first center of mass 23 in the unloaded state lies outside of the motor plane 17, in particular in the region of the magnetic element 15. In the loaded state, the second center of mass 24 lies approximately in the motor plane 17. This has the advantage that an additional torque about the vertical axis or, respectively, forces transverse to the guide plane 16 does not occur, which minimizes the wear to the guide system and thus maximizes the operating life.

The supporting elements 6 are preferably designed as rollers. In so doing, the rollers are preferably disposed above and below the guide rail 4, wherein two rollers are disposed either at the top or at the bottom of said guide rail; thus enabling the transporting unit 5 to be kept in the movement direction 8 without tipping and travel around a curve to nevertheless be possible at constant ratios. The guide system is preferably designed as a guide rail 4 comprising a V-shaped contact surface. The rollers have correspondingly a V-shaped notch, which engages with this contact surface. This has the advantage that the degree of freedom transversely to the movement direction 8 can very easily be restricted.

The transporting units 5 can have a driver 7. Said driver can be mounted on the side facing away from the guide plane 16. This has an advantageous effect on the center of mass of the transporting unit 5 because said center of mass also comes to rest closer to the region of the motor plane 17 in the unloaded state. The driver 7 is preferably controlled. This control takes place, for example, as described with the aid of FIG. 6. This has the advantage that, most notably, less space is required when the transporting unit 5 comprising the driver 7 is located in the region of a curved segment because the driver 7 can be retracted. The driver 7 can also be extended in a synchronized manner between two products and thus take on an individual product or a product group in the axis-linear region of the transporting arrangement 1, which, for example, is located below a product feed, onto which products are individually supplied in succession.

The use of guide systems on both sides of the motor plane has the advantage that substantially larger loads can be transported because the transport unit 5 is supported symmetrically. As a result, the number of the elements to be carried is increased and a resulting torque about the vertical axis is prevented.

The third exemplary embodiment shows a design of the guide rail 5 as a guide rod. This arrangement is particularly used for carton transport systems. In this case, a holding fixture 31 for a carton is, for example, used instead of the driver 7.

Figure 9:
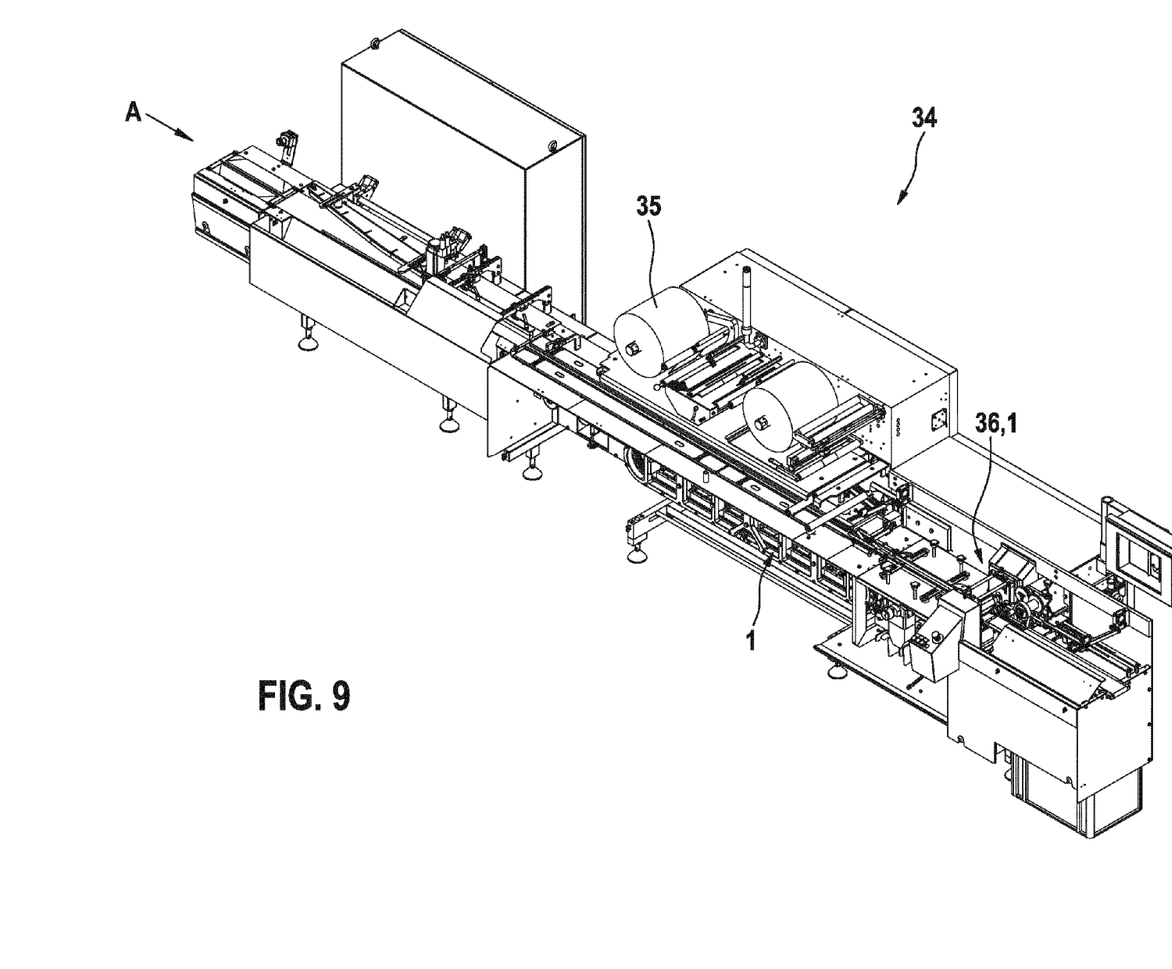
FIG. 9 to FIG. 11 show different configurations, comprising at least one of the inventive transport arrangements.

An exemplary application for a transporting arrangement 1 is shown in FIG. 9 using a horizontal tubular bag machine 34. Individual products are fed at location A to the tubular bag machine 34. A continuous film is unwound from a film roll 35 and formed into a tube by the two lateral ends comprising the inner surface of the film being laid one on top of the other and sealed to form a longitudinal seam. A transporting arrangement 1 according to the invention is used in this case as a packaged goods transporter and disposed in a vertical plane. On the upper side, products for packaging or product groups for packaging supplied by means of drivers 7 attached to the transporting unit 5 are entrained and transferred into the tube described above. After transferring the products for packaging, the transporting units 5 are led back again around a vertically arranged curve on the lower side. In so doing, the individual products for packaging or product groups for packaging can be individually entrained in a controlled manner, transported and transferred.

The tube is provided with a transverse seam between the products for packaging or product groups for packaging in a known manner and is separated into individual tubular bags. A transporting arrangement 1 can also be used for the control of the transverse sealing jaws, which are moved about an orbital path. A sufficient number of jaws are mounted on the transporting units 5. As a result, the individual sealing jaws can be individually controlled and, for example, synchronized to the film speed.

Figure 10:
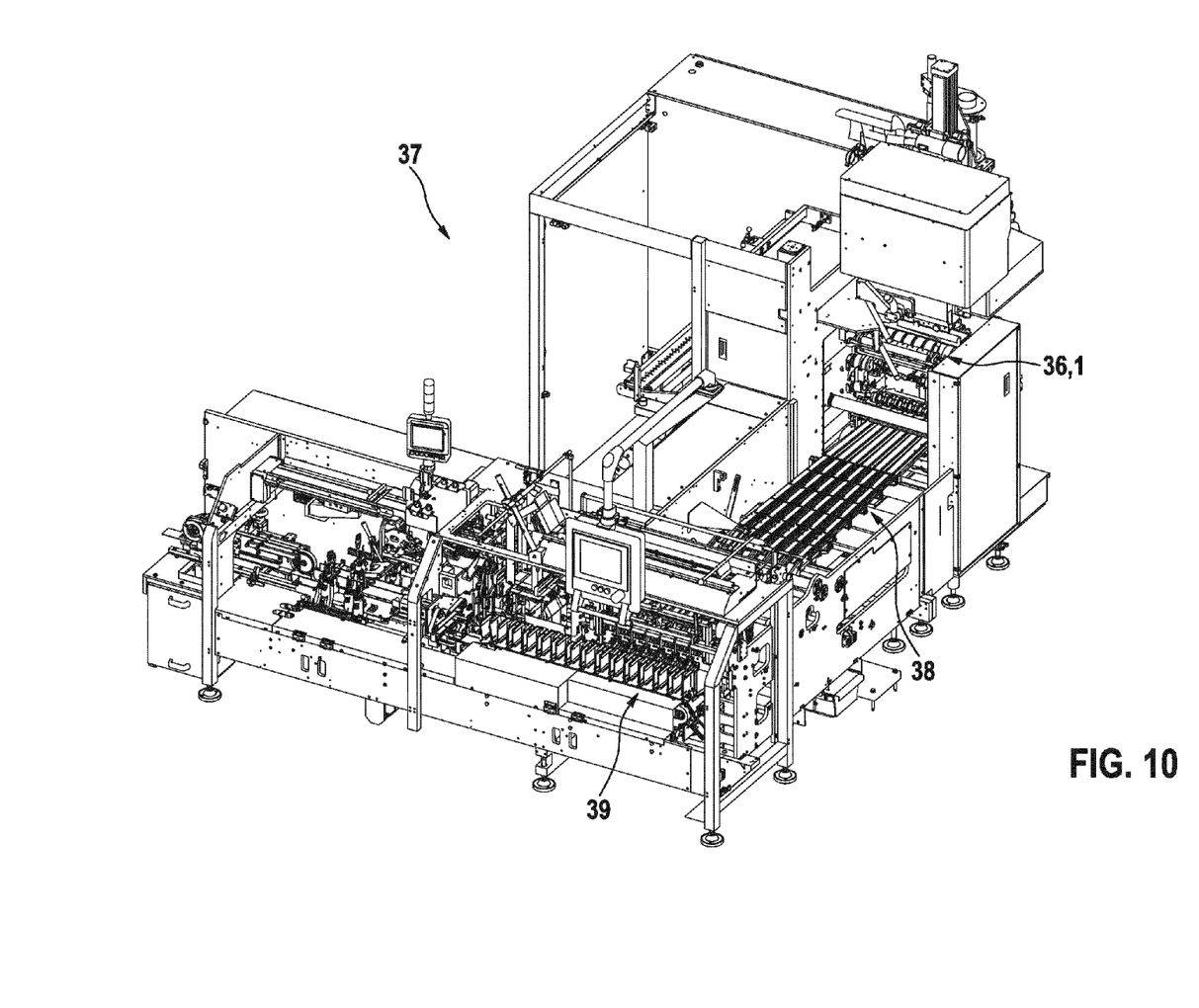

FIG. 10 depicts a further exemplary application comprising a vertical tubular bag machine 37. A continuous film is cut longitudinally into a plurality of webs, and each web is formed into a tube, similarly as described for the horizontal tubular bag machine 34. A sealing seam, which corresponds to the bottom of the bag, is produced transversely to the direction of movement of the film by means of the transverse sealing unit 36. Product capable of flowing, such as powder, liquid or also smaller piece goods is now filled from above via a known metering unit into open bags and subsequently sealed by a further transverse seam. This further transverse seam is simultaneously the bottom of the next bag. As was described with regard to the horizontal tubular bag machine 34, a transporting unit 5 according to the invention can be used for controlling the transverse sealing jaws. The transverse sealing seam is cut and individual bags are thereby produced. These bags can be supplied by means of a transporting arrangement 38 to a grouping unit 39, in which said bags are grouped and each group is individually introduced into cartons or a plurality of groups is introduced jointly into cartons. The transporting arrangement 1 according to the invention can be used here as a transporting and/or grouping unit.

Figure 11:
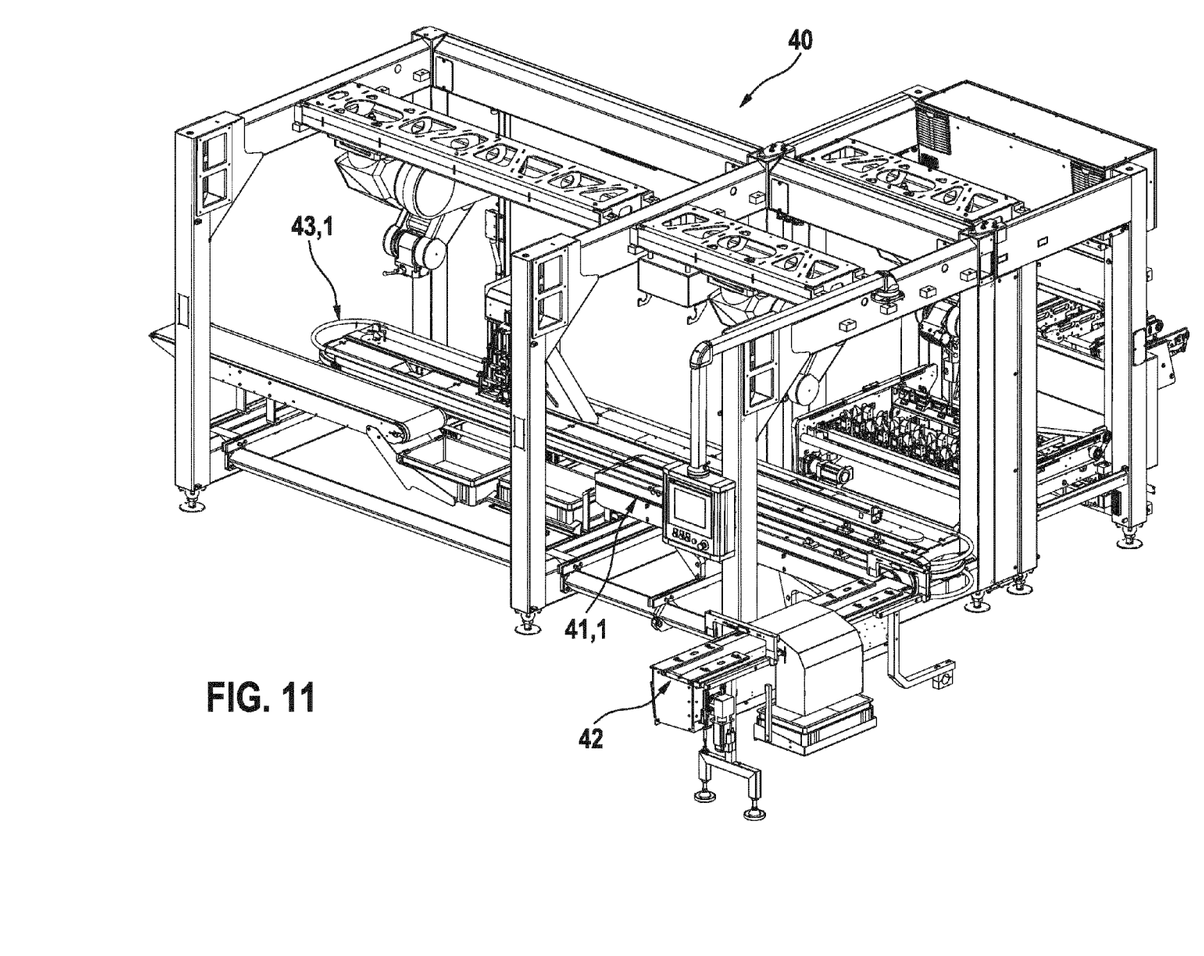

In a third exemplary application according to FIG. 11, a transporting arrangement 1 according to FIG. 8 is used. In this case, the transporting arrangement 1 is used in a cartoner 40. Cartons are placed upright from a flat blank or a folding box, filled and subsequently sealed. This process can take place in an integrated machine or successively in a plurality of machines. The carton transport 43, which transports the upright cartons or, respectively, cardboard boxes can now take place in such a transporting arrangement 1. In so doing, the transporting arrangement 1 can also be arranged in a horizontal plane and thus transport the cartons from one processing station to the next. The curved segments are arranged horizontally in this case. The products 14, which are supplied to the cartoner by means of a product feed 42, are usually received in a grouping unit 41 and grouped and filled into cartons in groups by means of a robot. This grouping unit can also be designed so as to comprise a transporting arrangement 1 according to the invention. FIG. 11 shows the transporting arrangement 1 as a carton transport 43 in horizontal orientation, a product grouping area 41 and a product feed 42.

The exemplary embodiments depicted render a transporting arrangement 1 possible in which tight curve radii are possible. As a result, interfaces with other process functions are made possible upstream and downstream (for example: introducing products to be packaged into a packaging tube of a horizontal tubular bag machine 34 by means of drivers 7 on the transporting unit 5, wherein the overall height is low). In addition, the circular path for the carton transport in a horizontal arrangement needs less space. The area of application of the transporting arrangement 1 is very large due to the compact design and the tight radii.

A stable and precisely positioned construction results from the lateral arrangement of the guide system. Manufacturing tolerances have less of an effect, whereby the manufacturing costs are reduced. Less adjustment is subsequently required. A qualitatively improved run of the transporting units 5 results from the precise positioning of the magnetic elements 15 in relation to the coils in the stator unit 3 and the measuring system 19.

Higher outputs and greater speeds can be achieved. Costs can thereby be saved because fewer machines can be used for certain production outputs. The wear to the guide system is reduced by the enhanced run quality and the service life of the total system is increased. By displacing the center of mass in the loaded state, torques and forces which act on the guide system are kept to a minimum. As a result, wear to the guide system is reduced. The natural frequency of the transporting units is displaced due to the higher rigidity of the system. This results in a better run quality, fewer vibrations and thus less wear and less noise.

The invention claimed is:

1. A transporting arrangement (1), comprising
at least one guide system having a fixed guide rail (4) and supporting elements (6) guided on the guide rail (4),
at least one transporting unit (5), which can be moved in a movement direction (8) and on which the supporting elements are fastened, wherein the transporting unit (5) is guided on the guide rail (4) by at least two of the supporting elements (6),
a linear motor drive arrangement having a fixed stator unit (3) and at least one magnetic element (15) on the transporting unit (5),
wherein a vertical guide plane (16) is defined, which runs parallel to the movement direction (8) and through a center of the guide system,
wherein a vertical motor plane (17) is defined, which runs parallel to the movement direction (8) and through a center of the linear motor drive arrangement,
wherein a basic body (11) of the transporting unit (5) is arranged between the guide plane (16) and the motor plane (17),
wherein the transporting unit (5) extends in a U-shaped manner across the stator unit (3),
wherein the at least one magnetic element (15) includes first and second magnetic elements (15) disposed respectively on the transporting unit (5) on opposite sides of the motor plane (17), and
wherein the transporting unit (5) is asymmetrical in a cross section defined perpendicularly to the movement direction (8) and the guide system is only on one side of the motor plane (17).

2. The transporting arrangement according to claim 1, characterized by a carrier (2) to which the guide rail (4) and the stator unit (3) are in each case separately fastened so that the guide rail (4) is not supported on the stator unit (3).

3. The transporting arrangement according to claim 1, characterized in that the supporting elements (6) abut against at least one contact point (26) on the guide rail (4), wherein the guide plane lies in the middle between an outermost contact point and an innermost contact point.

4. The transporting arrangement according to claim 1, characterized by a measuring system (19) for detecting a position of the transporting unit (5) comprising a second measuring component (22) on the transporting unit (5).

5. The transporting arrangement according to claim 4, characterized in that the second measuring component (22) is configured on a side of the basic body (11) of the transporting unit (5) which faces the motor plane (17).

6. The transporting arrangement according to claim 4, wherein the basic body (11) forms a limb, to which a further limb (13) lies opposite on the other side of the stator unit (3), and wherein the second measuring component (22) is configured or fastened on the further limb (13).

7. The transporting arrangement according to claim 4, characterized in that the guide rail forms a curved path, the curved path being composed of one or more curved sections, wherein the curved sections are defined by radii that each comprise a center, a neutral axis perpendicular to the guide plane running through each center,
wherein the guide rail (4) is spaced apart from the neutral axis (20) at a first distance (32),
wherein the measuring system (19) is spaced apart from the neutral axis (20) at a second distance (33),
wherein the at least one magnetic element (15) is spaced apart from the neutral axis (20) at a third distance (45),
wherein the second distance (33) deviates from the first distance (32) by a maximum of 20%, and
wherein the first distance (32) deviates from the third distance (45) by a maximum of 20%.

8. The transporting arrangement according to claim 4, characterized in that a vertical measuring plane (18) is defined parallel to the movement direction (8) and through the center of the measuring system (19), wherein the measuring plane (18) lies on the same side as the motor plane (17) in relation to the guide plane (16).

9. The transporting arrangement according to claim 1, characterized in that the transporting unit (5) has a first center of mass (23) in an unloaded state and has a second center of mass (24) when transporting a product (14), the second center of mass (24) lying closer to the motor plane (17) than the first center of mass (23).

10. The transporting arrangement according to claim 1, characterized in that the transporting unit (5) comprises one of a holding fixture (31) for carrying a product (14) or a driver (7) for pushing a product (14), wherein the holding fixture (31) or, respectively, the driver (7) and the guide plane (16) are configured on different sides of the motor plane (17).

11. The transporting arrangement according to claim 1, characterized in that the transporting unit (5) has a U-shape in a cross section defined perpendicularly to the movement direction (8), wherein limbs of the U-shape differ in length.

12. The transporting arrangement according to claim 1, characterized in that the supporting elements (6) and the guide rail (4) have a V-shaped contact surface.

13. A system, comprising a transporting arrangement (1) according to claim 1, and further comprising at least one of filling equipment and/or packaging equipment.

14. The transporting arrangement according to claim 4, characterized in that the guide rail forms a curved path, the curved path being composed of one or more curved sections, wherein the curved sections are defined by radii that each comprise a center, a neutral axis perpendicular to the guide plane running through each center,
- wherein the guide rail (4) is spaced apart from the neutral axis (20) at a first distance (32),
- wherein the measuring system (19) is spaced apart from the neutral axis (20) at a second distance (33),
- wherein the at least one magnetic element (15) is spaced apart from the neutral axis (20) at a third distance (45),
- wherein the second distance (33) deviates from the first distance (32) by a maximum of 15%, and
- wherein the first distance (32) deviates from the third distance (45) by a maximum of 15%.

\* \* \* \* \*